(12) United States Patent
Wang et al.

(10) Patent No.: US 9,268,720 B2
(45) Date of Patent: Feb. 23, 2016

(54) LOAD BALANCING SCHEME IN MULTIPLE CHANNEL DRAM SYSTEMS

(75) Inventors: Feng Wang, San Diego, CA (US);
Shiqun Gu, San Diego, CA (US);
Jonghae Kim, San Diego, CA (US);
Matthew Michael Nowak, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 550 days.

(21) Appl. No.: 12/872,282

(22) Filed: Aug. 31, 2010

(65) Prior Publication Data
US 2012/0054423 A1 Mar. 1, 2012

(51) Int. Cl.
*G06F 13/16* (2006.01)
*G06F 12/06* (2006.01)

(52) U.S. Cl.
CPC ........ *G06F 13/1647* (2013.01); *G06F 12/0607* (2013.01); *G06F 13/1642* (2013.01); *G06F 13/1657* (2013.01); *G06F 2213/0064* (2013.01)

(58) Field of Classification Search
None
See application file for complete search history.

(56) References Cited

U.S. PATENT DOCUMENTS

| 4,451,880 | A | | 5/1984 | Johnson et al. | |
|---|---|---|---|---|---|
| 5,016,167 | A | * | 5/1991 | Nguyen et al. | 711/151 |
| 6,170,023 | B1 | * | 1/2001 | Beardsley | G06F 12/06 710/3 |
| 6,526,462 | B1 | * | 2/2003 | Elabd | 710/242 |
| 7,415,565 | B2 | * | 8/2008 | Bullen et al. | 710/316 |
| 7,872,657 | B1 | | 1/2011 | Edmondson et al. | |
| 2003/0046477 | A1 | * | 3/2003 | Jeddeloh | 710/316 |
| 2005/0289268 | A1 | | 12/2005 | Miller | |
| 2008/0016254 | A1 | * | 1/2008 | Kruger et al. | 709/251 |
| 2008/0320254 | A1 | | 12/2008 | Wingard et al. | |
| 2009/0031067 | A1 | * | 1/2009 | Bartley et al. | 710/113 |
| 2010/0042759 | A1 | * | 2/2010 | Srinivasan et al. | 710/35 |
| 2010/0107142 | A1 | | 4/2010 | Chilimbi et al. | |
| 2010/0332696 | A1 | * | 12/2010 | Muppirala et al. | 710/39 |
| 2010/0332775 | A1 | | 12/2010 | Kapil et al. | |
| 2011/0029741 | A1 | * | 2/2011 | Kuo | 711/154 |
| 2011/0113199 | A1 | * | 5/2011 | Tang et al. | 711/130 |
| 2011/0154503 | A1 | * | 6/2011 | Stewart et al. | 726/26 |
| 2011/0167192 | A1 | * | 7/2011 | Iyer et al. | 711/5 |
| 2012/0054455 | A1 | | 3/2012 | Wang et al. | |
| 2014/0149653 | A1 | * | 5/2014 | Udipi et al. | 711/106 |

FOREIGN PATENT DOCUMENTS

| CN | 101140797 A | 3/2008 |
|---|---|---|
| CN | 101291275 A | 10/2008 |
| JP | H05314063 A | 11/1993 |

(Continued)

OTHER PUBLICATIONS

International Search Report and Written Opinion—PCT/US2011/050015—ISA/EPO—Nov. 25, 2011.

*Primary Examiner* — Nathan Sadler
(74) *Attorney, Agent, or Firm* — Donald D. Min; Paul Holdaway

(57) ABSTRACT

A load balancing in a multiple DRAM system comprises interleaving memory data across two or more memory channels. Access to the memory channels is controlled by memory controllers. Bus masters are coupled to the memory controllers via an interconnect system and memory requests are transmitted from the bus masters to the memory controller. If congestion is detected in a memory channel, congestion signals are generated and transmitted to the bus masters. Memory requests are accordingly withdrawn or rerouted to less congested memory channels based on the congestion signals.

21 Claims, 4 Drawing Sheets

(56) References Cited

FOREIGN PATENT DOCUMENTS

| | | |
|---|---|---|
| JP | H08278916 A | 10/1996 |
| JP | 2004152062 A | 5/2004 |
| TW | 200809516 A | 2/2008 |
| WO | WO0137088 A2 | 5/2001 |
| WO | 2006132006 A1 | 12/2006 |
| WO | 2009002998 A1 | 12/2008 |
| WO | 2009150475 A1 | 12/2009 |

* cited by examiner

LOAD BALANCING SCHEME IN MULTIPLE CHANNEL DRAM SYSTEMS

REFERENCE TO CO-PENDING APPLICATIONS FOR PATENT

The present Application for Patent is related to the following co-pending U.S. Patent Applications:
NON-UNIFORM INTERLEAVING SCHEME IN MULTIPLE CHANNEL DRAM SYSTEM by Feng Wang et al., having Ser. No. 12/872,458, filed concurrently herewith, assigned to the assignee hereof, and expressly incorporated by reference herein.

FIELD OF DISCLOSURE

Disclosed embodiments are related to multiple channel Dynamic Random Access Memory (DRAM) systems. More particularly, the embodiments are related to load balancing schemes in multiple channel DRAM systems.

BACKGROUND

DRAM systems are among the most common and least expensive memory systems used in computers. They are smaller in size, compared to Static Random Access Memory (SRAM) systems, and their small size enables the manufacture of high density DRAM systems. However, conventional DRAM systems are also slower than SRAM, and must be periodically refreshed in order to maintain the data stored in the memory. Hence, one of the significant considerations in controlling DRAM is the speed at which data can be read from or written to the memory.

A common technique to increase the access speed to and from the DRAM is called interleaving. The memory system is divided into two or more memory channels which can be accessed in parallel. Data in contiguously addressed memory locations are distributed among the memory channels such that contiguously addressed data words may be accessed in parallel. A request from the computer's processing unit to access contiguously addressed data words can be performed in parallel by a memory controller in such an interleaved system more rapidly than if these words were stored sequentially in the particular memory channel.

Data can flow across each memory channel independently and in parallel to other memory channels in interleaved memory access schemes. Memory systems may also be designed such that each memory channel is mapped to certain memory addresses and data can be transmitted to/from a memory channel based on the memory address mapping.

Depending on the nature of applications requiring access to the memory system at any given time, the traffic on a particular memory channel may increase drastically. As a result, that memory channel may get choked, stalling further access. For example, if a memory system comprises four memory channels, data in sequentially addressed data words may be distributed such that every fourth data word is allocated to a particular memory channel. If consecutive instructions in a particular application require sequential accesses to every fourth data word in the memory, then all the memory requests are routed to a single memory channel, causing the memory channel to be choked. Other memory channels may be relatively free in this scenario, but their available bandwidth is not effectively utilized. Sometimes exceptions or interrupts may also cause accesses to a particular memory channel to stall.

Load balancing schemes are commonly employed to remap memory addresses assigned to a particular memory channel in order to redistribute and balance the traffic load among different memory channels. In a common load balancing scheme, access patterns are statically generated by reordering a sequence of memory transactions, such that sequential transactions may proceed in parallel through two or more channels.

However, since the conventional approach is static in nature, and relies heavily on the access patterns, real time congestions on memory channels are not effectively handled by conventional load balancing schemes. For example, exceptions or interrupts may unpredictably alter the traffic in a channel. The conventional approach cannot adapt to balancing the load within a given timeframe. Since the traffic among the channels is not distributed efficiently, the available bandwidth in under-utilized channels in a given time frame goes unexploited. There is a need for load balancing techniques which are not encumbered by the limitations in conventional techniques.

SUMMARY

Exemplary embodiments are directed to systems and method for load balancing in multiple channel DRAM systems.

An exemplary embodiment is directed to a method for load balancing in a multiple DRAM system, the method comprising interleaving memory data across two or more memory channels, controlling access to the memory channels with memory controllers, and coupling bus masters to the memory controllers via an interconnect system. Memory request from the bus masters are transmitted to the memory controllers. The method comprises detecting congestion in a first memory channel, generating congestion signals if congestion is detected, and transmitting the congestion signals to the bus masters.

Another exemplary embodiment is directed to a DRAM system comprising memory data interleaved across two or more memory channels, memory controllers for controlling access to the memory channels, bus masters coupled to the memory controllers via an interconnect system. Memory requests are transmitted from the bus masters to the memory controllers. The system comprises logic for detecting congestion in a first memory channel in response to a memory request, and generating a congestion signal for the first memory channel.

Yet another exemplary embodiment is directed to a DRAM system comprising means for interleaving memory data across two or more channel means, controller means for controlling access to the channels means, and means for coupling bus masters to the controller means via an interconnect means. Memory requests are transmitted from the bus masters to the controller means. The system comprises means for detecting congestion in a first channel means and generating a congestion indication if congestion is detected.

A further exemplary embodiment is directed to a method for load balancing in a multiple DRAM system, the method comprising step for interleaving memory data across two or more memory channels, step for controlling access to the memory channels with memory controllers, and step for coupling bus masters to the memory controllers via an interconnect system. Memory request from the bus masters are transmitted to the memory controllers. The method comprises step for detecting congestion in a first memory channel, step for generating congestion signals if congestion is detected, and step for transmitting the congestion signals to the bus masters.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Figure 1:
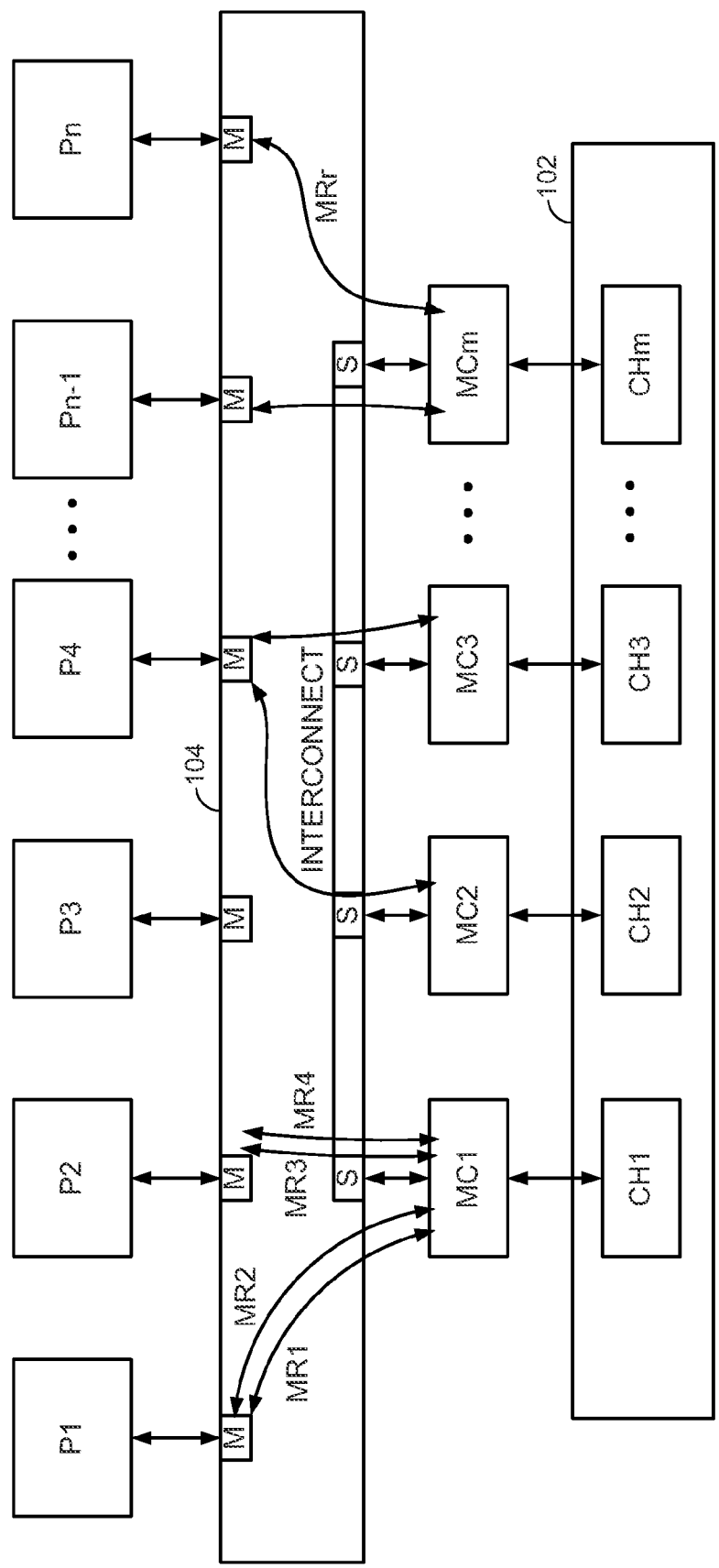
FIG. 1 illustrates a conventional multiple channel DRAM system with a plurality of bus masters coupled to a plurality of slave memory controllers through an interconnect system.

FIG. 1 illustrates an exemplary interleaved DRAM system. DRAM memory 102 may be a Through Silicon Stacking (TSS) stacked DDR. Interconnect 104 is a switching network that selectively interconnects multiple bus masters to multiple slaves via a dedicated, point-to-point interface. FIG. 1 illustrates "n" bus masters P1-Pn, which may comprise computer systems or peripheral devices requiring access to DRAM memory 102. FIG. 1 also illustrates "m" memory channels CH1-CHm. Access to each of the m channels CH1-CHm is controlled by the "m" memory controllers MC1-MCm.

The memory controllers MC1-MCm are slave devices which receive requests for memory access from bus masters P1-Pn, and respond accordingly. The value of m may not be equal to n. Several bus masters may request a memory access to a single channel at any given point in time. Further, less than all memory channels may be fully utilized at any given point in time. For optimum performance of the memory system, it is desirable that the requested bandwidth is efficiently distributed across all the memory channels.

Queuing mechanisms such as a memory request queue (not shown) may be employed in memory controllers. If multiple requests for memory access are made to a particular memory controller (slave) from either a single bus master or several bus masters, the memory request queue may get saturated when a threshold number of outstanding memory requests are reached. Access to the associated memory channel is stalled until all the outstanding requests are serviced. Such memory stalls severely affect the performance of the memory system. Conventional interleaved memory systems, lack the capacity to redirect outstanding requests in a saturated channel to an alternate channel(s) which may have bandwidth available to service the requests. Exemplary embodiments comprise techniques to query the memory request queue for information regarding the access history, in order to generate a congestion signal.

Figure 2:
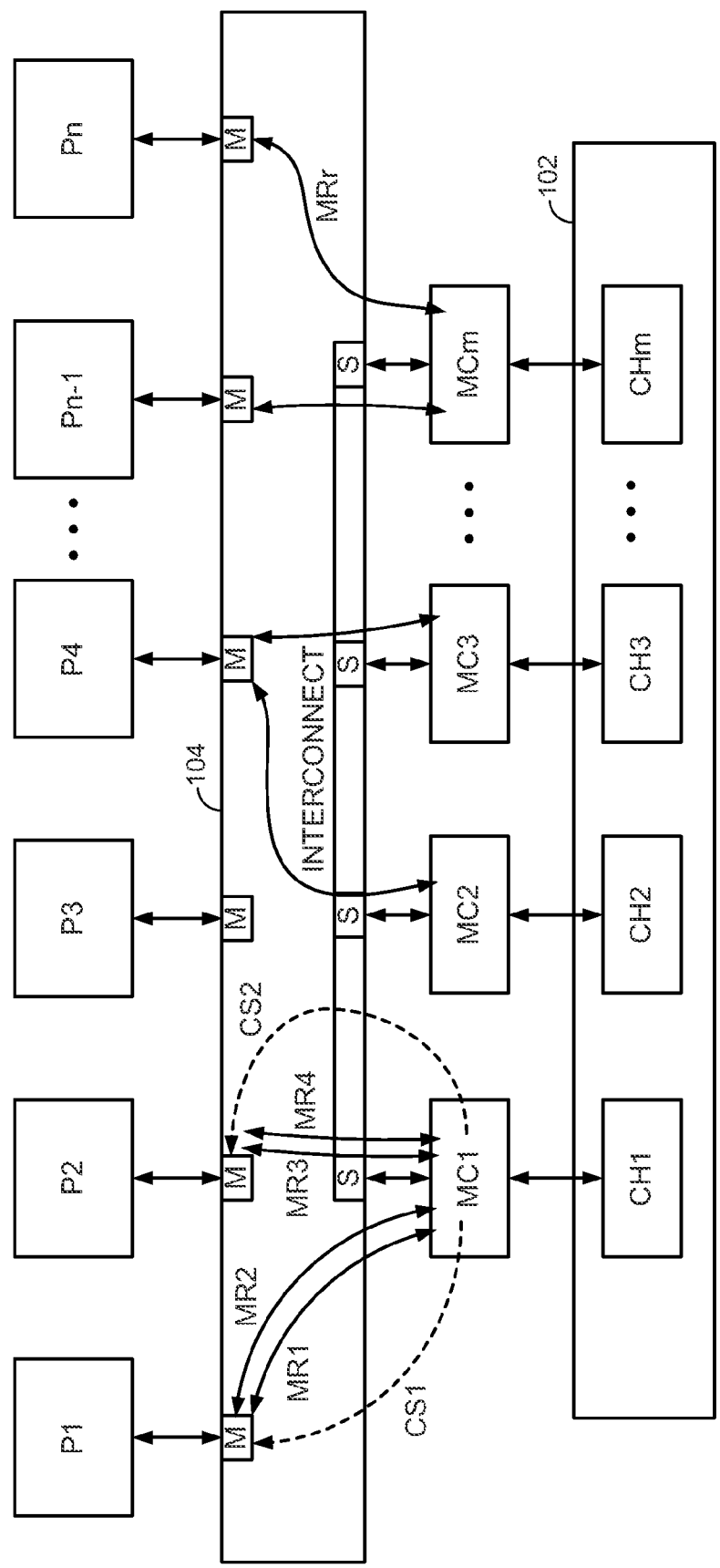
FIG. 2 illustrates congestions signals generated by memory controllers in response to memory requests from bus masters in an exemplary embodiment.

FIG. 2 illustrates "r" memory requests MR1-MRr. The memory requests MR1-MRr are illustrated using double sided arrows to incorporate the data traffic associated with servicing these memory requests. In an illustrative example, memory requests MR1-MR2 from bus master P1 and memory requests MR3-MR4 from bus master P2 are made to memory controller MC1. The data traffic associated with the four memory requests MR1-MR4 exceeds the maximum bandwidth of memory channel CH1. Instead of attempting to service all the requests MR1-MR4, and thus potentially stalling future accesses to memory channel CH1, Memory controller MC1 recognizes this congestion and generates congestion signals CS1 and CS2 to bus masters P1 and P2 respectively.

In the foregoing example, outstanding memory requests are sampled for a predetermined duration of time and congestion signals are generated when a predetermined threshold number of outstanding memory requests are reached. In an alternate embodiment, the memory controller may track a number of memory requests which are denied access. When a threshold number of denials are reached, congestion signals are generated.

The congestion signals may be a single digit binary value indicating whether the associated memory channel is congested or not. Exemplary embodiments may employ congestion signals that are two or more bits wide, in order to characterize a "degree of congestion". For example, in a 2-bit congestion signal, binary encoding 00 may indicate that the memory channel is minimally congested or freely available for access. Binary encodings 01 and 10 may represent intermediate congestion levels and 11 may indicate maximum congestion wherein all future requests will be stalled until the congestion subsides. Once congestion subsides, the congestion signals are appropriately de-asserted or set to minimal congestion values based on information from the memory request queue.

Assuming a single bit implementation of congestion signal CS1, wherein 0 indicates no congestion and 1 indicates that the memory channel is congested, when bus master P1 receives congestion signal CS1 asserted to 1, it may back off one or both of the memory requests MR1 and MR2 until the congestion signal CS1 is de-asserted. Alternately one or both memory requests MR1 and MR2 may be rerouted to an alternate memory channel whose congestion signal is not asserted.

Rerouting a memory request is achieved by remapping the memory address assigned to a particular memory channel. Memory Management Units (MMUs) are conventionally employed in DRAM systems. An exemplary MMU comprises a table wherein associations between memory access request addresses and physical addresses in the memory channels are maintained. To reroute a memory request from one channel to another, the address mapping in the table is altered by the MMU, to map the memory access request address to a physical address in an alternate memory channel which is not congested.

Figure 3:
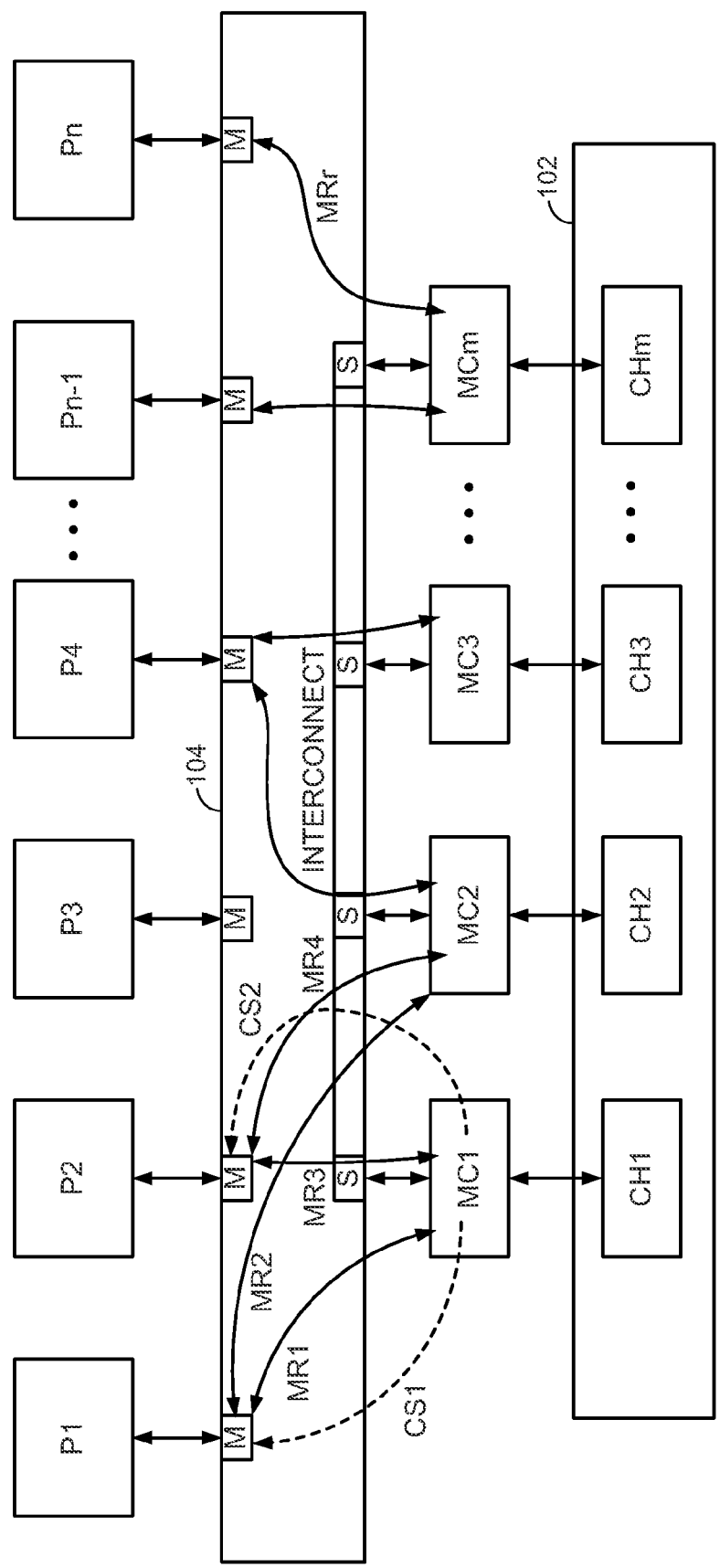
FIG. 3 illustrates memory requests from bus masters remapped in response to the congestion signals in an exemplary embodiment.

Bus master P2 behaves similarly in response to congestion signal CS2. FIG. 3 illustrates an exemplary embodiment wherein bus master P1 remaps memory request MR2 to memory channel CH2 through memory controller MC2. The congestion signal CS2 of memory controller MC2 is de-asserted. Similarly, bus master P2 remaps memory request MR4 to memory controller MC2.

Figure 4:
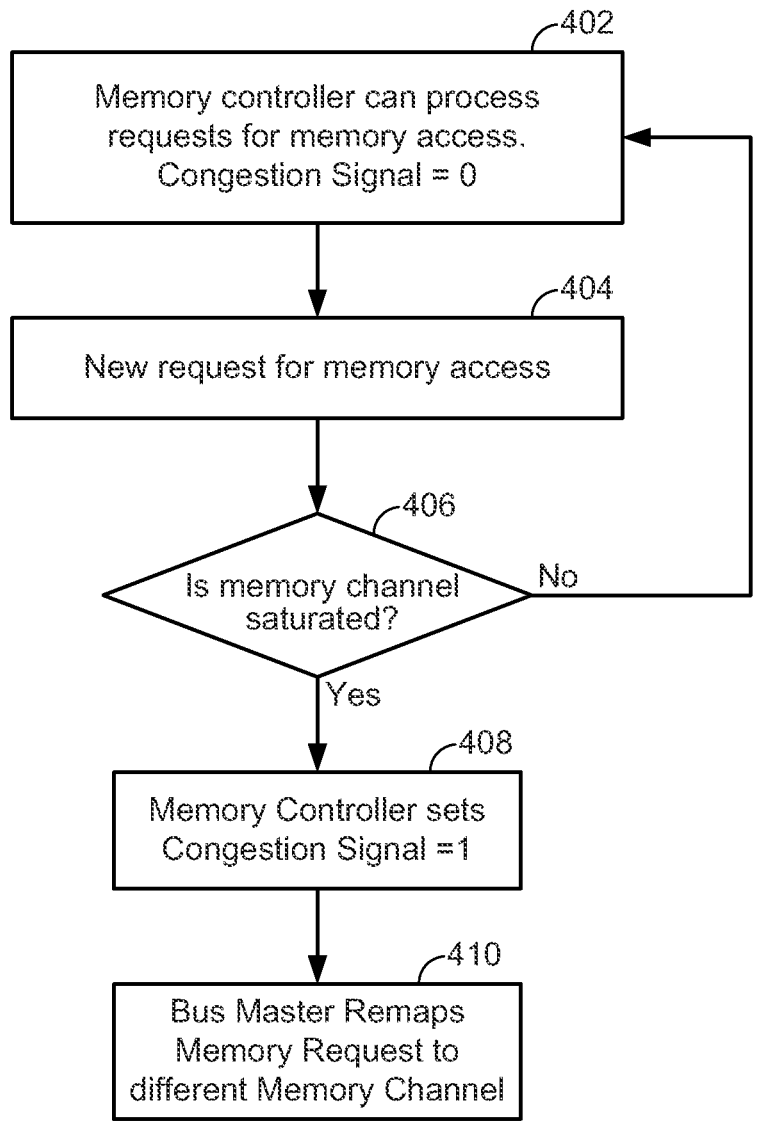
FIG. 4 is a flow chart illustrating the load balancing scheme according to an exemplary embodiment.

The foregoing technique for dynamic load balancing is illustrated in the flow chart of FIG. 4. At block 402, an exemplary memory controller maintains the congestion signal at 0, to represent to bus masters that the corresponding memory channel is available to process memory requests. At block 404, a new memory request is received from a bus master. Access history information in a memory request queue is queried at block 406, to determine whether the memory channel is congested. If the memory channel is not congested, then the congestion signal is maintained at 0 and the request is processed. The process returns to block 402.

On the other hand, if it is determined at block 406 that the memory channel is congested, then the memory controller sets the congestion signal to 1 at step 408. At block 410, the bus master recognizes that the congestion signal is asserted, and in response the MMU remaps the memory request to an alternate memory channel.

Accordingly, the disclosed load balancing scheme improves the performance of a multiple channel memory system by utilizing available bandwidth efficiently, and minimizing the memory stalls associated with congestion.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an embodiment of the invention can include a computer readable media embodying a method for load balancing in a multiple channel DRAM system. Accordingly, the invention is not limited to illustrated examples and any means for performing the functionality described herein are included in embodiments of the invention.

Embodiments of the disclosure may be suitably employed in any device which includes active integrated circuitry including memory and on-chip circuitry for test and characterization.

The foregoing disclosed devices and methods are typically designed and are configured into GDSII and GERBER computer files, stored on a computer readable media. These files are in turn provided to fabrication handlers who fabricate devices based on these files. The resulting products are semiconductor wafers that are then cut into semiconductor die and packaged into a semiconductor chip. The chips are then employed in devices described above While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method for load balancing in a multiple channel Dynamic Random Access Memory (DRAM) system, the method comprising:
   interleaving memory data across two or more memory channels;
   controlling access to the two or more memory channels with memory controllers;
   coupling bus masters to the memory controllers via an interconnect system;
   transmitting memory requests from the bus masters to the memory controllers;
   detecting congestion in a first memory channel in response to a memory request to a first memory controller by tracking a number of memory requests which are denied by the first memory controller, and determining that congestion exists in the first memory channel if a predetermined threshold number of denials of the memory requests by the first memory controller is reached;
   generating a congestion signal for the first memory channel;

transmitting the congestion signal to the bus masters; and
rerouting the memory request to a second memory controller in response to the congestion signal, wherein the rerouting comprises remapping a memory address association for the memory request from a first physical address in the first memory channel to a second physical address in a second memory channel coupled to the second memory controller, wherein a second congestion signal for the second memory channel is not asserted.

2. The method of claim 1, wherein the congestion signal comprises a single binary bit to represent congestion.

3. The method of claim 1, wherein the congestion signal comprises two or more binary bits to represent a range of congestion levels.

4. The method of claim 1, further comprising withdrawing the memory request to the first memory controller in response to the congestion signal.

5. The method of claim 1, wherein the DRAM system is integrated in at least one semiconductor die.

6. The method of claim 1, wherein the DRAM system is integrated into a device, selected from the group consisting of a set top box, music player, video player, entertainment unit, navigation device, communications device, personal digital assistant (PDA), fixed location data unit, and a computer.

7. A Dynamic Random Access Memory (DRAM) system comprising:
memory data interleaved across two or more memory channels;
memory controllers for controlling access to the two or more memory channels;
bus masters coupled to the memory controllers via an interconnect system, wherein the bus masters are configured to transmit memory requests to the memory controllers;
logic configured to generate a congestion signal for a first memory channel coupled to a first memory controller in response to a memory request, if a predetermined threshold number of denials of memory requests by the first memory controller is reached; and
logic configured to alter an address mapping for the memory request in a memory management unit (MMU) from an association to a first physical address in the first memory channel to a second physical address in a second memory channel wherein a second congestion signal for the second memory channel is not asserted, in order to reroute the memory request to a second memory controller coupled to the second memory channel, in response to the congestion signal.

8. The DRAM system of claim 7, wherein the congestion signal comprises a single binary bit to indicate congestion.

9. The DRAM system of claim 7, wherein the congestion signal comprises two or more binary bits to indicate a range of congestion levels.

10. The DRAM system of claim 7 further comprising logic configured to transmit the congestion signal to the bus masters.

11. The DRAM system of claim 10, further comprising logic to withdraw the memory request to the first memory controller, in response to the congestion signal.

12. The DRAM system of claim 7 integrated in at least one semiconductor die.

13. The DRAM system of claim 7 integrated into a device, selected from the group consisting of a set top box, music player, video player, entertainment unit, navigation device, communications device, personal digital assistant (PDA), fixed location data unit, and a computer.

14. A Dynamic Random Access Memory (DRAM) system comprising:
channel means for accessing memory data, wherein memory data is interleaved across two or more channel means;
controller means for controlling access to the channel means;
means for coupling bus masters to the controller means via an interconnect means;
means for transmitting memory requests from the bus masters to the controller means;
means for generating a congestion indication for a first channel means coupled to a first controller means, in response to a memory request, comprising means for tracking a number of memory requests which are denied by the first controller means and means for determining that congestion exists if a predetermined threshold number of denials of the memory requests by the first controller means is reached; and
means for rerouting the memory request to a second memory controller means in response to the congestion indication, comprising means for remapping a memory address association for the memory request from a first physical address in the first channel means to a second physical address in the second channel means coupled to the second controller means, wherein a second congestion signal for the second channel means is not asserted.

15. The DRAM system of claim 14, wherein the congestion indication comprises binary signal means for indicating congestion.

16. The DRAM system of claim 14, wherein the congestion indication comprises binary signal means to indicate a range of congestion levels.

17. The DRAM system of claim 14, further comprising means for transmitting the congestion indication to the bus masters.

18. The DRAM system of claim 17, further comprising means for withdrawing the memory request to the first controller means, in response to the congestion indication.

19. The DRAM system of claim 14 integrated in at least one semiconductor die.

20. The DRAM system of claim 14 integrated into a device, selected from the group consisting of a set top box, music player, video player, entertainment unit, navigation device, communications device, personal digital assistant (PDA), fixed location data unit, and a computer.

21. A non-transitory computer-readable storage medium comprising code, which, when executed by a processor, causes the processor to perform operations for load balancing in a multiple channel Dynamic Random Access Memory (DRAM) system, the non-transitory computer-readable storage medium comprising:
code for interleaving memory data across two or more memory channels;
code for controlling access to the two or more memory channels with memory controllers;
code for coupling bus masters to the memory controllers via an interconnect system;
code for transmitting memory requests from the bus masters to the memory controllers;
code for detecting congestion in a first memory channel in response to a memory request to a first memory controller by tracking a number of memory requests which are denied by the first memory controller, and determining that congestion exists in the first memory controller if a predetermined threshold number of denials of the memory requests by the first memory controller is reached;

code for generating a congestion signal for the first memory channel;

code for transmitting the congestion signal to the bus masters; and code for rerouting the memory request to a second memory controller in response to the congestion signal, comprising code for remapping a memory address association for the memory request from a first physical address in the first memory channel to a second physical address in a second memory channel coupled to the second memory controller, wherein a second congestion signal for the second memory channel is not asserted.

* * * * *